United States Patent [19]

Stark

[11] Patent Number: 4,775,784

[45] Date of Patent: Oct. 4, 1988

[54] CREDIT CARD IMPRINTER AUTHORIZATION TERMINAL

[75] Inventor: David A. Stark, Apple Valley, Minn.

[73] Assignee: Data Card Corporation, Minneapolis, Minn.

[21] Appl. No.: 832,164

[22] Filed: Feb. 26, 1986

[51] Int. Cl.⁴ .............................................. G06K 5/00
[52] U.S. Cl. .................................... 235/380; 364/900
[58] Field of Search ........................ 235/380; 364/900; 101/45

[56] References Cited

U.S. PATENT DOCUMENTS

| | | |
|---|---|---|
| 3,763,777 | 10/1973 | Brown . |
| 3,896,721 | 7/1975 | See . |
| 3,898,622 | 8/1975 | Maynard et al. . |
| 3,905,022 | 9/1975 | Klosky et al. . |
| 3,931,614 | 1/1976 | Vasa et al. . |
| 4,025,760 | 5/1977 | Trenkamp . |
| 4,031,518 | 6/1977 | Holloran ............................. 364/900 |
| 4,106,062 | 8/1978 | Foote . |

OTHER PUBLICATIONS

MAX ™ brochure (2 pgs.).
MAPP 100 brochure by Mastercard (2 pgs.).
Security 914 brochure (2 pgs.).
Security 919 brochure (2 pgs.).

Primary Examiner—Harold I. Pitts
Attorney, Agent, or Firm—Merchant, Gould, Smith, Edell, Welter & Schmidt

[57] ABSTRACT

A credit card imprinter authorization terminal (20) including an imprinter device (24), keyboard (26), a display (28), a credit card reader (30), and a printer (32) all contained on a single housing structure (22). The credit card authorization terminal (20) includes a microprocessor (36) and its associated memory (38) for controlling operation of the credit card authorization terminal. The printer (32) provides an automatic printout of credit card transaction related information providing an audit trail for future reference.

11 Claims, 4 Drawing Sheets

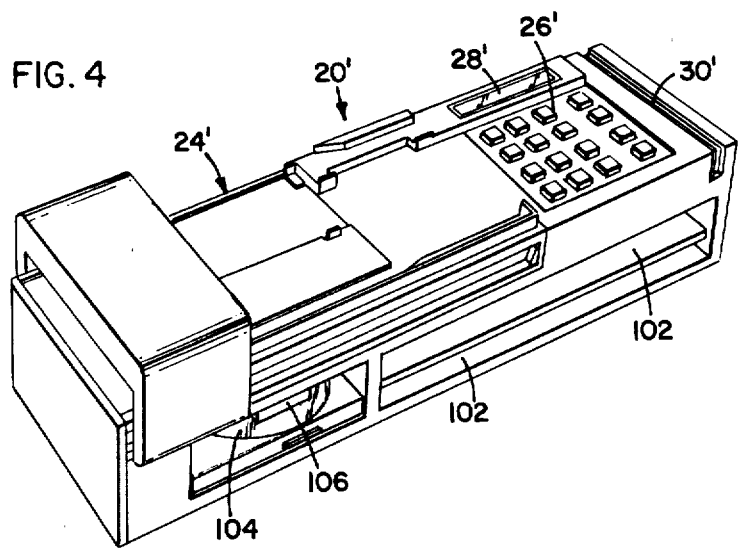

CREDIT CARD IMPRINTER AUTHORIZATION TERMINAL

The present invention relates to a credit card authorization terminal. More particular, the present invention relates to a credit card authorization terminal including an imprinter.

In today's world, a large percentage of, if not most, retail transactions take place by the use of credit. Most adults carry on their person a credit card associated with some retail chain, financial institution, etc. With the increased use of credit cards come many associated problems. There is always the possibility of losing or having one's credit cards stolen, and their being used by an unauthorized user. In addition, due to the instant availability of credit, some users have a tendency to charge on their line of credit more than they are authorized to charge. In an effort to deal with these problems, retail merchants, and the like, are required to verify with remote authorization centers whether the credit card holder has a sufficient line of credit for the transaction, and is authorized to use the card. Typically, this is accomplished by the merchant calling a remote authorization processing center so as to obtain authorization over the phone. Recently, authorization terminals have been developed which include a credit card reader, keyboard, display, and communications port all under microprocessor control. When a credit card transaction occurs, the authorization terminal is utilized to read the account number information on the credit card and establish communications with the remote authorization processing center. The credit card account number related information is then transmitted electronically to the remote authorization processing center. Upon receipt of the account information, the remote authorization processing center checks if there is proper authorization to utilize the card for the specified amount entered at the keyboard of the authorization terminal and also transmitted electronically from the authorization terminal. The card issuer then electronically transmits an appropriate response to the card authorization terminal, the response being displayed at the card authorization terminal.

There is a need for card authorization terminals which provide for an integration of features in a single housing. For example, there is a real need for an authorization terminal which will provide a paper record of the credit card transaction, including audit information such as date of the transaction, credit card account number, the amount of the transaction, and authorization number or identifier. Moreover, the retail merchant after obtaining authorization on a credit card account must then use a credit card imprinter device so as to create multiple paper copies of the transaction details. Often times, the credit card imprinter device will not be readily available and/or being used. Moreover, the credit card imprinter device does not provide audit trail type information.

Additionally, there is a need for an integrated card authorization terminal which efficiently utilizes counter space. Additionally, there is a need for a card authorization terminal which allows various configurations having a wide range of functional capability.

Additionally, there is a need for an integrated card authorization terminal which provides card authenticating capabilities to reduce counterfeiting and fraudulent use of credit cards.

The present invention solves these and many other problems associated with currently available authorization terminals.

SUMMARY OF THE INVENTION

The present invention relates to a credit card imprinter authorization terminal for use during credit card transactions including keyboard means for operator entry of credit card transaction related information and display means for display of information. The credit card authorization terminal further includes printer means for printing credit card transaction related information and credit card reader means for reading credit card information stored on the credit card. The credit card authorization terminal is operatively controlled by microprocessor control means operatively interconnected to the keyboard means, display means, printer means, and credit card reader means. Data communication means is operatively interconnected to the microprocessor control means for communicating data between the microprocessor control means of the authorization terminal and a remote authorization processing location. Additionally, the credit card authorization terminal includes a credit card imprinter means for imprinting credit card transactions onto paper copies, the credit card imprinter means being contained in a housing structure housing the keyboard means, display means, credit card reader means, printer means, and microprocessor control means.

In a preferred embodiment of the present invention, the printer means will automatically provide a printout of audit related information which might include credit card account number, transaction amount, authorization number, date, time, merchant identifier, and authentication code information under microprocessor control means control when proper authorization is received from the remote authorization processing center. This paper, or hard copy, printout can then be used later on for audit purposes.

The present invention provides a convenient, single housing structure including the credit authorization terminal, printer means, and credit card imprinter means.

In alternate embodiments of the present invention, the microprocessor control means might be operatively interconnected to a second keyboard herein referred to as a pin pad, for entry of the credit card holder's identification number so as to provide an additional element of security in the system.

In yet other embodiments of the present invention, a microprocessor control means will include sufficient memory so as to enable capture and storage of the credit card transaction related data. The credit card transaction data can then be downloaded at a later time to the remote authorization processing location. An optional telephone handset might be included so as to enable use of the authorization terminal as a telephone.

In yet other embodiments of the invention, a magnifying glass might be incorporated as a part of the housing structure for reading very small print on credit cards. In addition, an ultraviolet light might be included for reading print which is visible only under ultraviolet light.

Various storage compartments might be included along with the authorization terminal to provide for storage of transaction documents.

In those situations where a printout of audit information or the like is not required, the authorization terminal might not include the printer means.

These and various other advantages and features of novelty which characterize the invention are pointed out with particularity in the claims annexed hereto and forming a part hereof. However, for a better understanding of the invention, its advantages, and objects obtained by its use, reference should be made to the drawings which form a further part hereof, and to the accompanying descriptive matter, in which there is illustrated and described a preferred embodiment of the invention. It will be appreciated that the invention has application for plastic cards in general, regardless of their nature.

BRIEF DESCRIPTION OF THE DRAWINGS

In the drawings, in which like reference numerals and letters indicate corresponding parts throughout the several views;

FIG. 4 is an alternate embodiment of an authorization terminal; and

FIG. 5 is yet another embodiment of an authorization terminal.

DETAILED DESCRIPTION OF A PREFERRED EMBODIMENT OF THE PRESENT INVENTION

Figure 1:
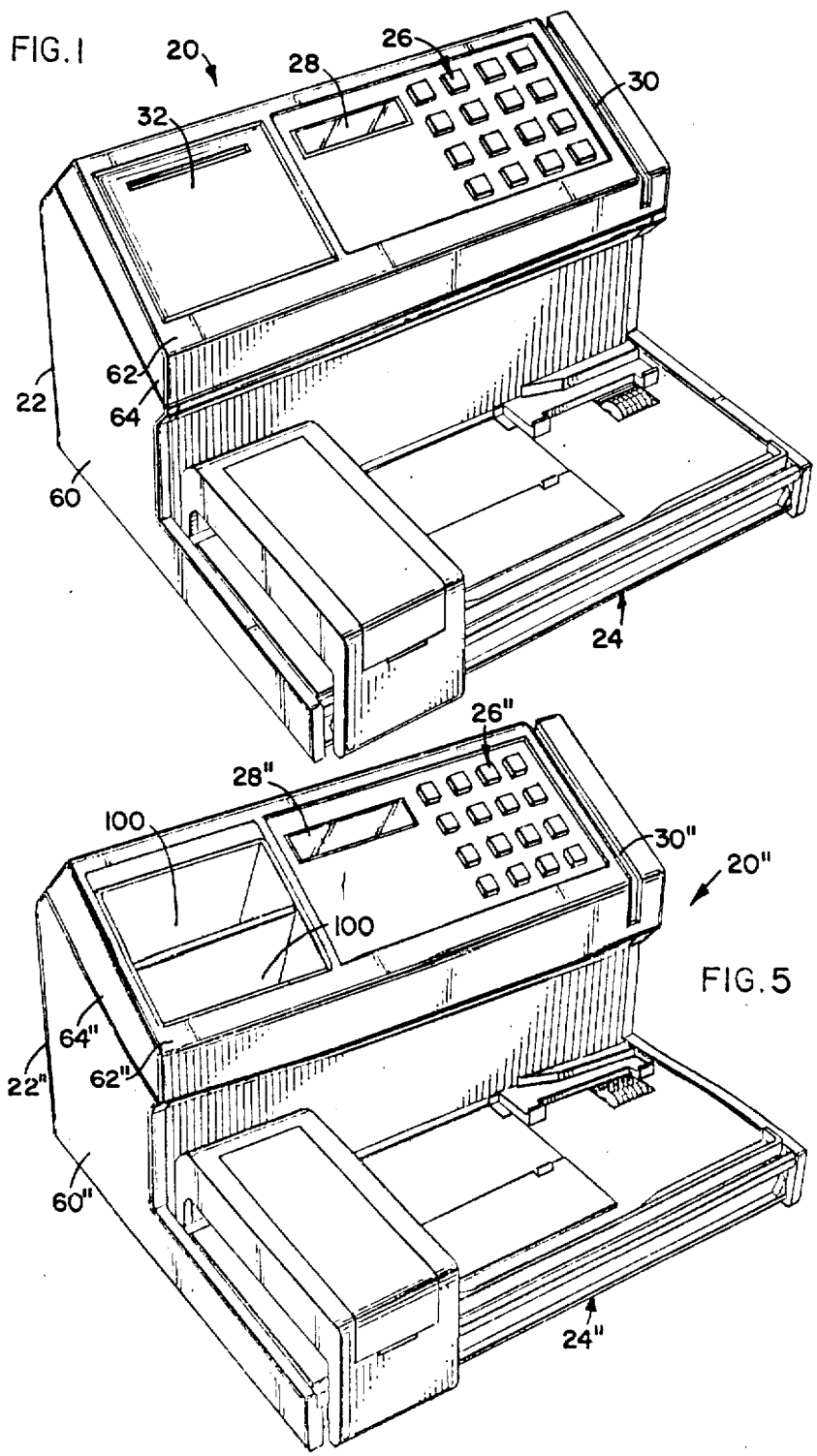
FIG. 1 is a view and perspective of an embodiment of an authorization terminal in accordance with the principles of the present invention.
Figure 2:
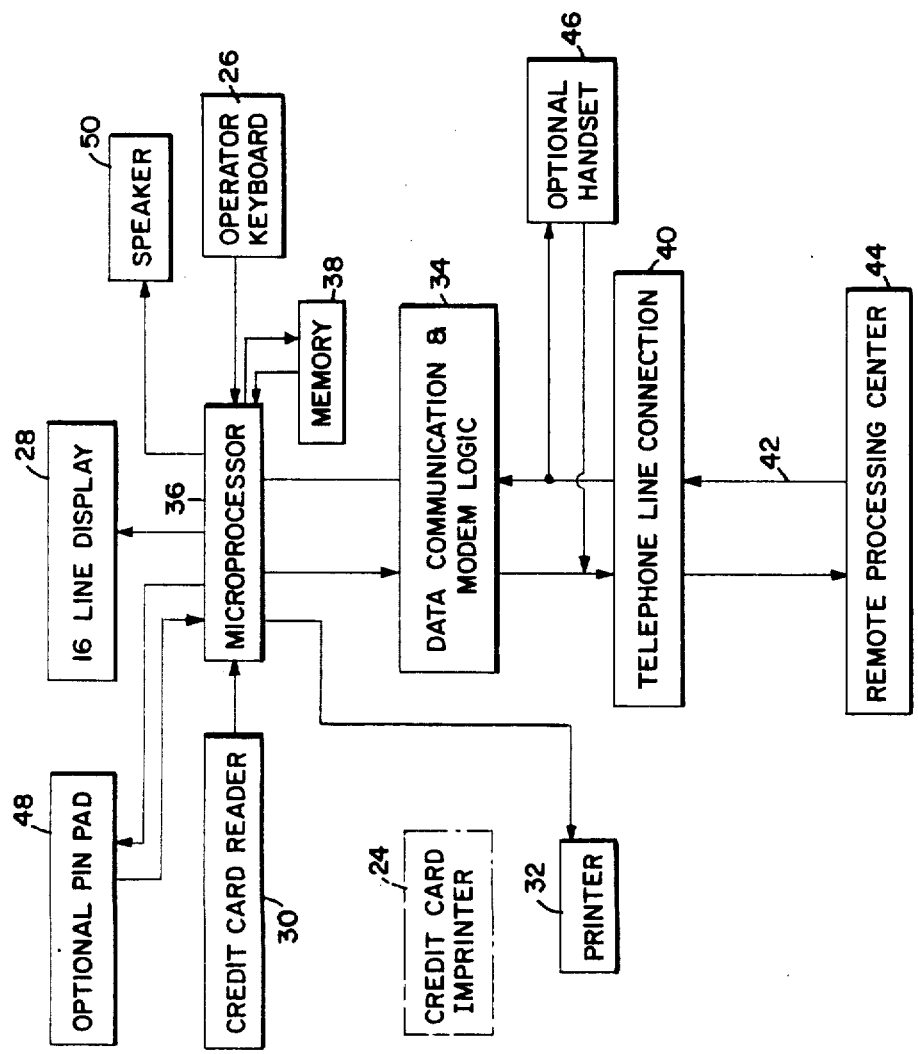
FIG. 2 is a block diagram of the embodiment illustrated in FIG. 1.

Illustrated in FIGS. 1 and 2 is a preferred embodiment of an authorization terminal, generally designated by the reference numeral 20, in accordance with the principles of the present invention. The authorization terminal 20 includes a single housing 22 incorporating a credit card imprinter device 24, a keyboard 26, a display 28, a vertically positioned credit card reader 30 for reading the magnetically encoded data on a magnetic strip of a credit card, a printer device 32, and a data communication and modem logic 34 all operated by a microprocessor 36 and its associated memory 38. Power for the authorization terminal might be derived from a conventional AC outlet or from an internal DC battery supply or from an AC outlet transformer unit. As indicated in FIG. 2, the authorization terminal will preferably have a communication port providing for a suitable telephone line connection 40 so as to enable communication over telephone lines 42 or the like to a remote authorization processing center 44. The data communication and modem logic 34 might be customized to meet communication requirements in various countries. As illustrated in FIG. 2, the authorization terminal might include an optional handset 46 so as to enable use as a telephone for conventional voice transfer. In addition, a pin pad 48 or second keyboard might be provided either as a part of the housing 22 or as a separate unit for entry of a credit card holder's identification number. As illustrated, the optional pin pad 48 would be suitably interconnected to the microprocessor 36 for input of data thereto. Additonally, a speaker 50 might be provided so as to allow the authorization terminal 20 to serve as an intercom device, provide voice authorization, keyboard response, and/or monitor dialing activity.

Figure 3:
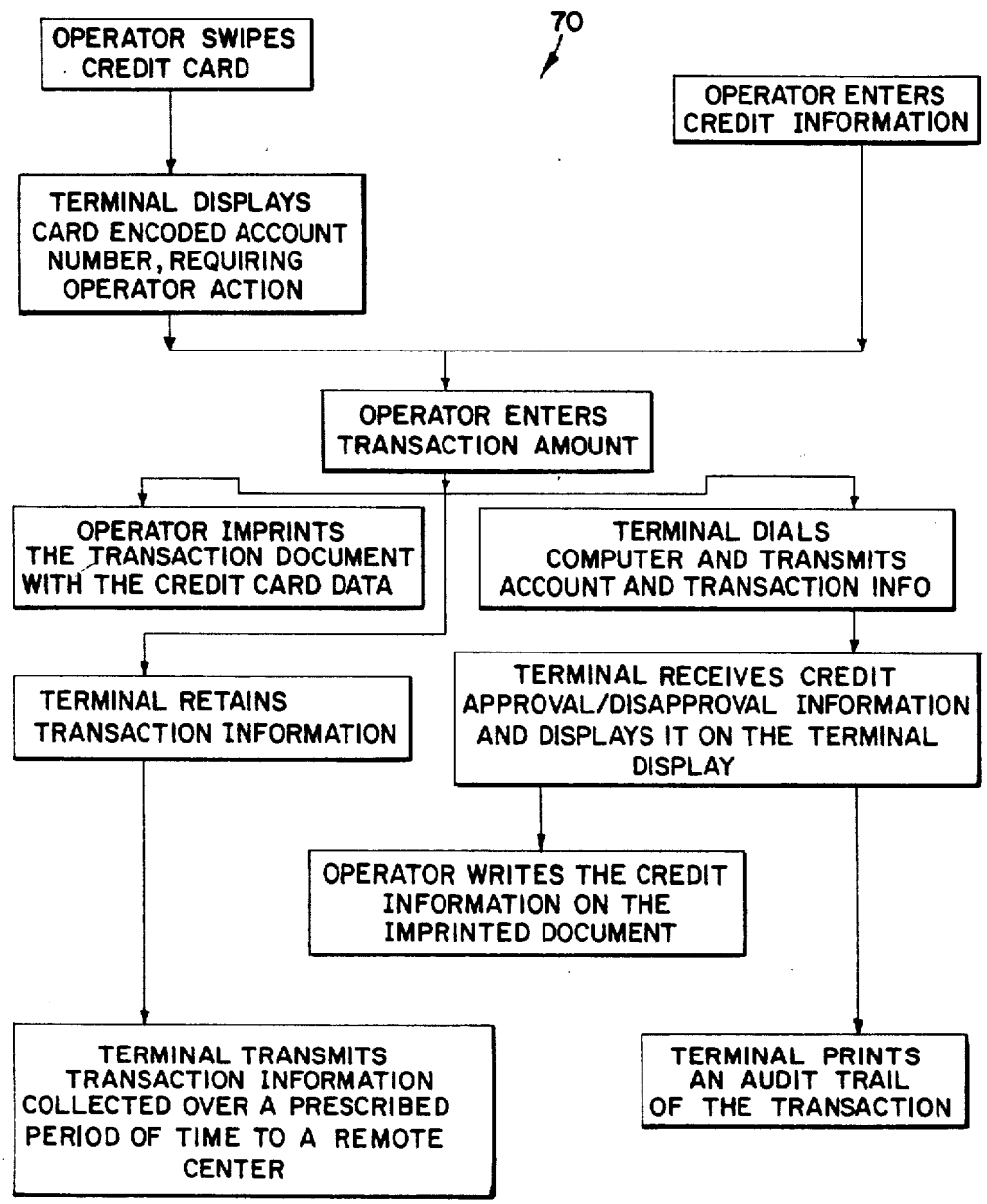
FIG. 3 is a flow diagram illustrating a typical use of the embodiment shown in FIG. 1.

It will be appreciated by looking at FIGS. 1 and 2, that the present invention provides a data authorization terminal which is relatively compact so as to not clutter up a counter space and yet be readily accessible and provide for a fast accurate way to verify credit. Moreover, as illustrated in FIG. 3, the data authorization terminal 20 might include sufficient memory so as to enable storing of credit card transaction information for later downloading or transmittal of the credit card transaction information to a remote processing center. Moreover, the present invention provides retail merchants maximum flexibility and security. In seconds they can authorize transactions for all types of major credit cards, private label cards, and access check acceptance services.

It will be appreciated, that the isolated operational elements of the data authorization terminal 20 represent commercially available technology with the microprocessor 36 being programmed so as to provide suitable control over the individual operational elements.

The housing configuration of the preferred embodiment facilitates ease of use. The imprinter device, is generally configured as a rugged flatbed type of imprinter. Immediately behind the imprinter 24 the housing structure 22 includes a raised or vertically extending portion 60 defining a surface 62 disposed above the imprinter device 24 and extending upwardly and away from the imprinter device 24. Positioned on the surface 62 so as to facilitate ease of use, are the keyboard 26, the display 28, the credit card reader 30, and the printer device 32. In addition, the housing portion 60 includes an overhanging portion 64 which projects generally forwardly of the housing portion 60 so as to provide for efficient use of counter space. It will be appreciated, that the authorization terminal 20 of the present invention provides a relatively small footprint on the counter shelf.

In typical use, as illustrated by the flow diagram 70, the operator will swipe the credit card through the credit card reader 30. In some instances, the authorization terminal will provide the operator with the capability to verify that the embossed numer on the card is the same as the encoded number for authenticating that the card has not been altered. The data authorization terminal 20 will then usually display on the display 28 the card encoded account number. At this point, the operator will enter the amount of the transaction. The data authorization terminal will then electronically transmit the account and transaction information to the remote authorization processing center. The data authorization terminal 20 will then receive credit approval/disapproval information and display it on the terminal display. The operator imprints the transaction document with the credit card data and writes the credit information on the imprinted document. If the data authorization terminal 20 has sufficient information to retain the overall transaction information, the data authorization terminal can be utilized to download or electronically transmit transaction information at a later point in time to the remote authorization processing center. At the time of the transaction, the printer 32 under the control of the microprocessor 36 will print an audit trail of the transaction including credit card account number, transaction amount, and authorization number.

Illustrated in FIG. 4 is an alternate embodiment of a data authorization terminal 20' which includes a keyboard 26', display 28', credit card reader 30', and imprinter 24'. As with the first embodiment, the data authorization terminal 20' will include suitable data communication and modem logic and be controlled by a suitable microprocessor and associated memory. In this embodiment, there is no printer and the housing takes on a generally flatbed appearance.

Illustrated in FIG. 5, is an embodiment of a data authorization terminal 20" similar to the embodiment illustrated in FIG. 1 except that the data authorization terminal does not include a printer. In place of the printer, there is included storage compartments 100 for storage of appropriate documentation. It will be appreciated, that this embodiment, as well as the embodiments illustrated in FIGS. 1 and 4, might also include as a part of their housing structures, storage shelves positioned, for example, underneath the main housing structure. This is illustrated in FIG. 4, for example, at 102.

As an added security feature, the data authorization terminal 20 of the present invention might include a magnifying glass 104 suitably mounted, e.g., slideably or hingedly, on the housing 22 for reading small print on the credit card as well as an ultraviolet light source 106 for reading print invisible except when exposed to ultraviolet light. The magnifying glass and ultraviolet light might be located adjacent the storage compartment 102 as illustrated in FIG. 4 if present or in the raised portion of the authorization terminal 20.

It is to be understood that even though the above numerous characteristics and advantages of the invention have been set forth in the foregoing description, together with details of the structure and function of the invention, the disclosure is illustrative only, and changes may be made in detail, especially in matters of shape, size and arrangement of parts within the principle of the invention to the full extent indicated by the broad general meaning of the terms in which the appended claims are expressed.

What is claimed is:

1. A credit card imprinter authorization terminal for use during credit card transactons, including:
   (a) keyboard means for operator entry of credit card transaction related information;
   (b) display means for display of credit card transaction related information;
   (c) credit card reader means for reading credit card information stored on the credit card;
   (d) printer means for printing credit card transaction related information on receiving media separate from the credit card;
   (e) microprocessor control means operatively interconnected to the keyboard means, display means, printer means, and credit card reader means for controlling operation thereof;
   (f) data communication means operatively interconnected to the microprocessor control means for electronically transferring data between the microprocessor control means and a remote processing location; and
   (g) a credit card imprinter means for imprinting credit card transactions, the imprinter means being a part of a single housing structure housing the keyboard means, display means, credit card reader means, and printer means.

2. A credit card authorization terminal in accordance with claim 1, wherein the housing structure includes a raised housing portion including the keyboard means, display means, credit card reader means, and printer means, the credit card imprinter means being positioned forwardly of the raised housing portion.

3. A credit card authorization terminal in accordance with claim 2, whrein the keyboard means and the display means are positioned on a surface of the raised housing portion disposed above the credit card imprinter means and extending upwardly and away from the credit card imprinter means.

4. A credit card authorization terminal in accordance with claim 3, the credit card reader means being positioned on the same surface as the keyboard means and the display means.

5. A credit card authorization terminal in accordance with claim 4, wherein the printer means is positioned on the same surface as the keyboard means and the printer means.

6. A credit card authorization terminal in accordance with claim 1, wherein the microprocessor control means is operatively interconnected to the printer means for automatically printing audit information including credit card account number, amount of transaction, and authorization number for each credit card transaction.

7. A credit card authorization terminal in accordance with claim 1, further including an ultraviolet light means mounted on the housing structure.

8. A credit card authorization terminal in accordance with claim 1, further including a magnifying glass means mounted on the housing structure.

9. A credit card authorization terminal in accordance with claim 1, further including pin pad means operatively interconnected to the microprocessor control means for entry of user identification information.

10. A credit card imprinter authorization terminal for use during credit card transactions, including:
    (a) keyboard means for operator entry of credit card transaction related information;
    (b) display means for display of credit card transaction related information;
    (c) credit card reader means for reading credit card information stored on the credit card;
    (d) microprocessor control means operatively interconnected to the keyboard means, display means, and credit card reader means for controlling operation thereof;
    (e) data communication means operatively interconnected to the microprocessor control means for electronically transferring data between the microprocessor control means and a remote processing location, and
    (f) a credit card imprinter means for imprinting credit card transactions, the imprinter means being a part of a single housing structure housing the keyboard means, display means, and credit card reader means, the imprinter means having a credit card receiving surface, the housing structure of said credit card authorizatin terminal including a raised housing portion including the keyboard means, display means, and credit card reader means, the credit card receiving surface of the credit card imprinter means being positioned forwardly of the raised housing portion whereby the credit card receiving surface is freely accessible by the user so as to enable placement of the card thereon.

11. A credit card authorization terminal in accordance with claim 10, wherein the keyboard means and the display means are positioned on a surface of the raised housing portion disposed above the card receiving surface of the credit card imprinter means and extending upwardly and away from the credit card imprinter means.

* * * * *